United States Patent
Dong et al.

(10) Patent No.: US 10,281,913 B2
(45) Date of Patent: May 7, 2019

(54) METHODS AND SYSTEMS FOR INTELLIGENT PREDICTIVE AIRCRAFT TAKEOFF REJECTION DECISION MAKING

(71) Applicant: The Boeing Company, Chicago, IL (US)

(72) Inventors: Jian Dong, Bellevue, WA (US); Naveed Moayyed Hussain, Palos Verdes Peninsula, CA (US)

(73) Assignee: The Boeing Company, Chicago, IL (US)

( * ) Notice: Subject to any disclaimer, the term of this patent is extended or adjusted under 35 U.S.C. 154(b) by 150 days.

(21) Appl. No.: 15/676,380

(22) Filed: Aug. 14, 2017

(65) Prior Publication Data

US 2019/0049953 A1    Feb. 14, 2019

(51) Int. Cl.
*G05D 1/00* (2006.01)
*G08G 5/00* (2006.01)
(Continued)

(52) U.S. Cl.
CPC ......... *G05D 1/0055* (2013.01); *G05D 1/0083* (2013.01); *G05D 1/0202* (2013.01);
(Continued)

(58) Field of Classification Search
CPC .. G05D 1/0055; G05D 1/0083; G05D 1/0202; G08G 5/0065; B64C 39/02; B64C 2201/141
See application file for complete search history.

(56) References Cited

U.S. PATENT DOCUMENTS 3,920,204 A    11/1975    Bissell et al.
4,837,695 A    6/1989    Baldwin
(Continued)

FOREIGN PATENT DOCUMENTS

EP    2 637 151    9/2013
EP    3 029 637    6/2016
(Continued)

OTHER PUBLICATIONS

Extended European Search Report issued by the European Patent Office in application No. EP 18 17 7860.6 dated Jan. 3, 2019.
(Continued)

*Primary Examiner* — Calvin Cheung
(74) *Attorney, Agent, or Firm* — McDonnell Boehnen Hulbert & Berghoff LLP

(57) ABSTRACT

An example method for predictive take-off rejection (TOR) of an aircraft includes receiving, at a computing device on the aircraft and at a time before the aircraft takes off for a current flight, outputs from a plurality of sensors positioned on the aircraft, comparing the outputs received from the plurality of sensors for the current flight to reference flight data, based on comparing the outputs received from the plurality of sensors for the current flight to the reference flight data the computing device making a determination of whether to initiate a TOR procedure before the aircraft reaches a takeoff speed on a runway, and based on determining to initiate the TOR procedure, the computing device sending a signal to a control device on the aircraft to initiate the TOR procedure.

20 Claims, 8 Drawing Sheets

(51) Int. Cl.
    *G05D 1/02*     (2006.01)
    *B64C 39/02*     (2006.01)

(52) U.S. Cl.
    CPC ............ *G08G 5/0065* (2013.01); *B64C 39/02* (2013.01); *B64C 2201/141* (2013.01)

(56) References Cited

U.S. PATENT DOCUMENTS

| | | | |
|---|---|---|---|
| 5,142,478 A | 8/1992 | Crook | |
| 5,606,505 A | 2/1997 | Smith et al. | |
| 5,796,612 A | 8/1998 | Palmer | |
| 6,002,972 A | 12/1999 | Palmer | |
| 6,527,225 B1 | 3/2003 | Silder, Jr. et al. | |
| 8,560,149 B1* | 10/2013 | Ganguli | G01C 23/005 |
| | | | 701/15 |
| 9,164,505 B1* | 10/2015 | Peck | B64C 25/426 |
| 2008/0154445 A1 | 6/2008 | Goodman et al. | |
| 2013/0211636 A1* | 8/2013 | Martins | G05D 1/0083 |
| | | | 701/15 |

FOREIGN PATENT DOCUMENTS

| | | |
|---|---|---|
| EP | 3 091 410 | 11/2016 |
| WO | WO 85/01372 | 3/1985 |

OTHER PUBLICATIONS

Office Action issued by the European Patent Office in application No. EP 18 17 7860.6 dated Jan. 21, 2019.

* cited by examiner

METHODS AND SYSTEMS FOR INTELLIGENT PREDICTIVE AIRCRAFT TAKEOFF REJECTION DECISION MAKING

FIELD

The present disclosure relates generally to aircraft, and more particularly, to a system and method to automatically initiate a rejected takeoff procedure based on a predictive aircraft takeoff rejection decision.

BACKGROUND

A takeoff rejection (TOR) decision may be a situation in which it is decided to abort the takeoff of an aircraft while the aircraft is on the runway. There may be many reasons for deciding to perform a TOR. In general, a TOR may be performed due to suspected or actual technical failure or flight hazard. A TOR procedure may be comprised of a series of maneuvers to stop the takeoff roll of an aircraft once the thrust has been raised and the takeoff has begun.

Presently, an operator of an aircraft may be required to detect a specific event, for example an engine fire, by using audible and or visual cues and or alerting signals or other tactile cues available to the aircraft operator. If the event occurs below a takeoff decision speed, commonly referred to as $V_1$, there generally is enough runway remaining to stop the aircraft and the pilot needs to initiate a TOR immediately upon detection of the TOR generating event.

Presently, an aircraft crew generally needs to detect the TOR generating event using the aforementioned alerting, process this information, and start configuring the aircraft for stopping. However, there is often very little time to both detect the TOR generating event, and then have enough time to perform the TOR procedure due to a lack of stopping distance being available on the runway once the takeoff has begun. Delays in initiating the TOR procedure may increase the risk of aircraft overrun, airplane/occupant damage or injury, and the like.

Therefore, it would be desirable to provide a system and method that overcomes the above.

SUMMARY

In an example, a method for predictive take-off rejection (TOR) of an aircraft is describing including receiving, at a computing device on the aircraft and at a time before the aircraft takes off for a current flight, outputs from a plurality of sensors positioned on the aircraft. The plurality of sensors output data representative of different types of physical phenomena. The method also includes comparing the outputs received from the plurality of sensors for the current flight to reference flight data, and the reference flight data includes a data stream collected for the same sensors positioned at a substantially same location on the aircraft, during substantially same flight conditions, and during a successful takeoff of the aircraft. The method also includes based on comparing the outputs received from the plurality of sensors for the current flight to the reference flight data, the computing device making a determination of whether to initiate a TOR procedure before the aircraft reaches a takeoff speed on a runway, and when the outputs received from the plurality of sensors for the current flight are outside of a threshold range of the reference flight data, the computing device determines to initiate the TOR procedure. The method also includes based on determining to initiate the TOR procedure, the computing device sending a signal to a control device on the aircraft to initiate the TOR procedure.

In another example, a non-transitory computer readable storage medium having stored therein instructions, that when executed by a computing device having one or more processors, causes the computing device to perform functions. The functions comprise receiving, at a time before an aircraft takes off for a current flight, outputs from a plurality of sensors positioned on the aircraft, and the plurality of sensors output data representative of different types of physical phenomena. The functions also comprise comparing the outputs received from the plurality of sensors for the current flight to reference flight data, and the reference flight data includes a data stream collected for the same sensors positioned at a substantially same location on the aircraft, during substantially same flight conditions, and during a successful takeoff of the aircraft. The functions also comprise based on comparing the outputs received from the plurality of sensors for the current flight to the reference flight data, making a determination of whether to initiate a TOR procedure before the aircraft reaches a takeoff speed on a runway, and when the outputs received from the plurality of sensors for the current flight are outside of a threshold range of the reference flight data, the computing device determines to initiate the TOR procedure. The functions also comprise based on determining to initiate the TOR procedure, sending a signal to a control device on the aircraft to initiate the TOR procedure.

In another example, a system is described comprising a plurality of sensors positioned on an aircraft, and the plurality of sensors output data representative of different types of physical phenomena. The system also comprises a computing device having one or more processors for executing instructions stored in a non-transitory computer readable storage medium to perform functions. The functions comprise receiving, at a time before the aircraft takes off for a current flight, outputs from the plurality of sensors positioned on the aircraft, and comparing the outputs received from the plurality of sensors for the current flight to reference flight data. The reference flight data includes a data stream collected for the same sensors positioned at a substantially same location on the aircraft, during substantially same flight conditions, and during a successful takeoff of the aircraft. The functions also comprise based on comparing the outputs received from the plurality of sensors for the current flight to the reference flight data, making a determination of whether to initiate a TOR procedure before the aircraft reaches a takeoff speed on a runway, and when the outputs received from the plurality of sensors for the current flight are outside of a threshold range of the reference flight data, the computing device determines to initiate the TOR procedure. The functions also comprise based on determining to initiate the TOR procedure, sending a signal to a control device on the aircraft to initiate the TOR procedure.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples described herein, systems and methods for predictive take-off rejection (TOR) of an aircraft are described. A plurality of sensors are positioned on the aircraft and output data representative of different types of physical phenomena. The outputs as received from a current flight are compared to reference flight data that includes a data stream collected for the same sensors positioned at a substantially same location on the aircraft, during substantially same flight conditions, and during a prior successful takeoff of the aircraft. The comparison can enable a determination of whether to initiate a TOR procedure before the aircraft reaches a takeoff speed on a runway. For example, when the outputs received from the plurality of sensors for the current flight are outside of a threshold range of the reference flight data, the TOR procedure can be initiated.

Various sensor outputs can be used to determine whether to initiate the TOR procedure including outputs from a vision sensor, an audio sensor, an ultrasound sensor, a strain gauge sensor, a temperature sensor, a fire/smoke sensor, a fuel sensor, a hydraulic pressure sensor, a landing gear tire pressure sensor, an electricity load sensor, and a vibration sensor, for example. Such sensors can provide outputs that indicate there may be an issue with the aircraft, and the TOR procedure should be initiated.

In many examples, an aircraft TOR decision is time sensitive. A fraction of second time could determine whether the takeoff may be possible to stop. Existing TOR decision making systems react to emergency events that are occurring during a takeoff time period, which usually leaves little time for making the TOR decision. Within examples described herein, intelligent predictive TOR decisions can be made as early as possible, for aircrafts with pilots or without pilots (UAVs), to provide as much time as possible to execute the TOR decision. For example, a TOR decision can be made at the following time periods: when the aircraft initiates an auxiliary power unit (APU) prior to leaving a gate, when the aircraft runs a main engine at a gate, when the aircraft taxis to the runway, when the aircraft arrives at a beginning of the runway, and when the aircraft increases a speed on the runway for takeoff. Execution of the TOR decision can then include controlling the aircraft to come to a stop.

Figure 1:
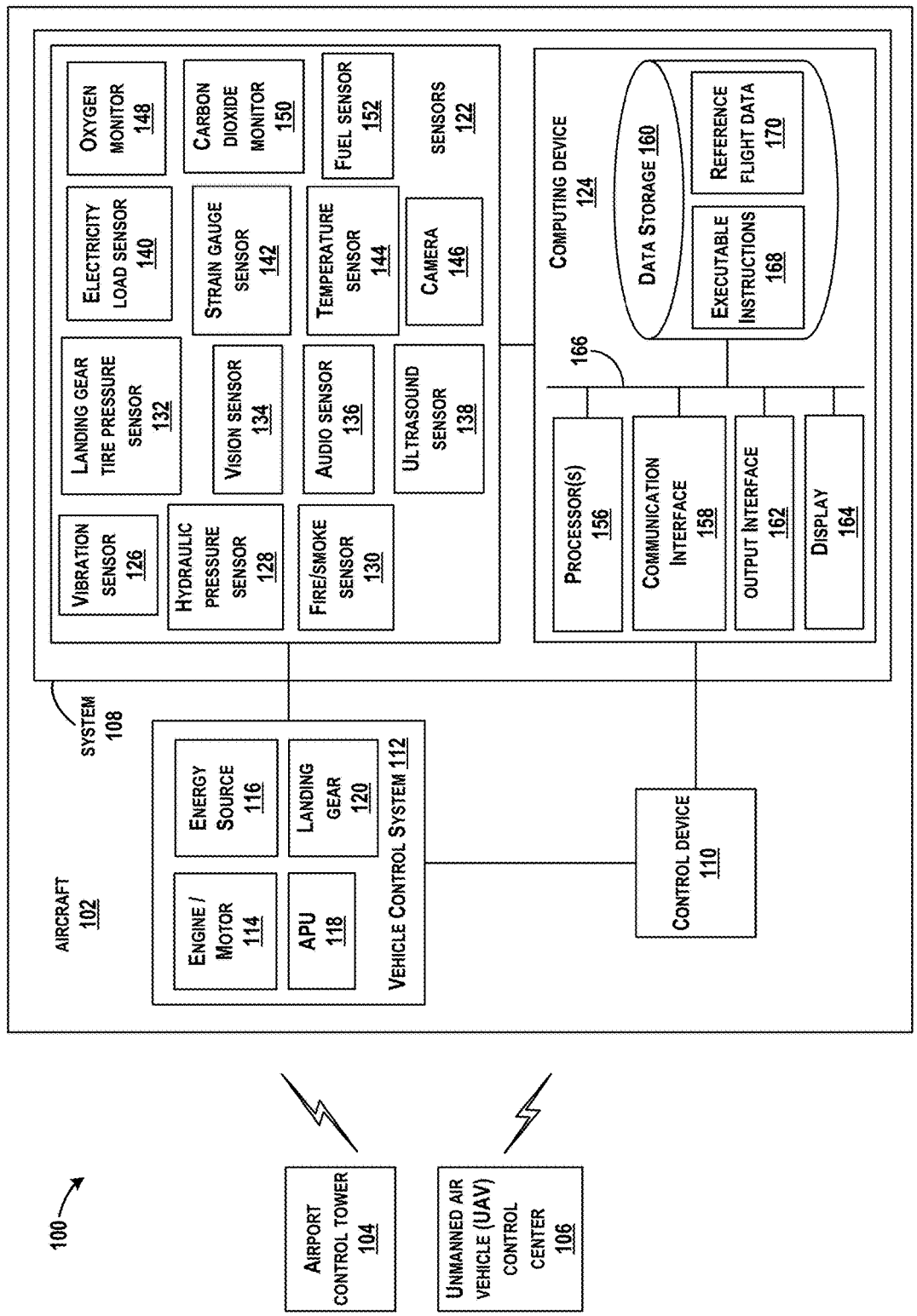
FIG. 1 is a block diagram of an operating environment, according to an example implementation.

Referring now to the figures, FIG. 1 is a block diagram of an operating environment 100, according to an example implementation. The operating environment 100 includes an aircraft 102 in communication with one or more of an airport control tower 104 and/or an unmanned air vehicle (UAV) control center 106.

The airport control tower 104 is in wireless communication with the aircraft 102 and may be a ground-based controller to provide advisory services and commands to the aircraft 102, such as indicating take-off instructions. The UAV control center 106 provides similar wireless communications to unmanned air vehicles, for example.

The aircraft includes a system 108, a control device 110, and a vehicle control system 112.

The control device 110 may be a computing device and may have components such as a processor and memory for executing instructions to perform functions of controlling operations of the aircraft. For example, the control device 110 may receive outputs of the system 108, and control operations of the vehicle control system 112 such as to start or stop a takeoff.

The vehicle control system 112 includes an engine/motor 114, an energy source 116, an auxiliary power unit (APU) 118, and landing gear 120. Depending on whether the aircraft 102 is a passenger aircraft or an UAV, various engines and energy sources can be used. An example energy source 116 can include fuel or batteries for providing power to the aircraft 102. The engine/motor 114 can be a combustion engine or an electric engine to name a few examples. The APU 118 can provide power to the aircraft 102 at various times during or before flight, and the landing gear 120 may be used for takeoff or landing and supports the aircraft 102 when not in flight and generally includes tires/wheels (or also skids, skis, floats or a combination of these and other elements).

The system 108 includes a plurality of sensors 122 positioned on the aircraft 102, and a computing device 124. The plurality of sensors 122 are positioned on the aircraft 102 at different areas on the aircraft 102, and the plurality of sensors 122 output data representative of different types of physical phenomena to the computing device 124. The plurality of sensors 122 include a vibration sensor 126, a hydraulic pressure sensor 128, a fire/smoke sensor 130, a landing gear tire pressure sensor 132, a vision sensor 134, an audio sensor 136, an ultrasound sensor 138, an electricity load sensor 140, a strain gauge sensor 142, a temperature sensor 144, a camera 146, an oxygen sensor 148, a carbon dioxide sensor 150, and a fuel sensor 152. More or fewer sensors may also be included, and more than one of any sensor can also be included.

The vibration sensor 126 may be positioned on a wing of the aircraft 102 to detect vibrations. For example, the vibration sensor 126 may be positioned at locations on the aircraft 102, such as on the wings, vertical stabilizer, horizontal stabilizers, engines, and landing gear structure, etc., where any vibration above a threshold amount may be indicative of a potential mechanical issue. The vibration sensor 126 can be or include an accelerometer, which measures vibration, shock and accelerations, for example.

The hydraulic pressure sensor 128 may be positioned on any hydraulic system in the aircraft 102, such as on hydraulic systems controlling actuators for flaps, slats, spoilers, rudders, elevators, landing gears, etc.

The fire/smoke sensor 130 may be positioned in a number of areas, and more than one fire/smoke sensor can be positioned on the aircraft 102. As an example, the fire/smoke sensor 130 may be positioned near the engine/motor 114 to detect instances of fire/smoke in that area. The fire/smoke sensor 130 can also be positioned in an interior the aircraft 102 cabin or other areas as well.

The landing gear tire pressure sensor 132 can be positioned in communication with the landing gear 120 to detect a tire pressure of wheels of the landing gear 120, for example.

The vision sensor 134 can include devices that capture an image of a part of the aircraft 102 during operation. For example, the vision sensor 134 can include a charge-coupled device (CCD) camera that directly captures digital images. The vision sensor 134 can be positioned at locations on the aircraft 102 to capture images of engine operation, wing flap/slat operation, rudder/elevator operation, landing gear operation, etc.

The audio sensor 136 can include a sound sensor and can be positioned to capture audio signals during aircraft operations, such as positioned on or near moving parts such as the engine, flap, slat, rudder, elevator and landing system, etc.

The ultrasound sensor 138 can be positioned at locations on the aircraft 102 to capture ultrasound signals resulted from structure crack growth. The ultrasound sensor 138 can be used for crack detection, and may be positioned, for example, on structures such as wings, fuselage, engines and vertical/horizontal stabilizers, etc.

The electricity load sensor 140 can be positioned in communication with any number of electrical circuits in the aircraft 102 to detect loads of the circuits. The electricity load sensor 140 can include a power sensor that is used to measure electricity load (AMPS) and/or load changes for an electricity consumption system such as an actuator, a cabin environment control system, etc. The electricity load sensor 140 can be positioned on the aircraft 102 in communication with such systems or in communication with power sources coupled to such systems.

The strain gauge sensor 142 can be positioned on a surface of a structure of the aircraft 102 that receives structure loads, and is used to measure strain on a structure system.

The temperature sensor 144 may include a thermal sensor that is used to measure temperature, and can be positioned on the aircraft 102 within or in proximity to systems that require temperature controls such as engines, actuators, inside cabin, etc.

The camera 146 can be positioned at various areas on the aircraft 102 to capture images and live-video.

The oxygen sensor 148 can be positioned inside a passenger cabin and pilot compartment of the aircraft 102, and is used to measure the oxygen content.

The carbon dioxide sensor 150 can be positioned inside a passenger cabin and a pilot compartment of the aircraft 102, and is used to measure the carbon dioxide content. The carbon dioxide sensor 150 may also be positioned at or in proximity to an emission system of the aircraft 102 to measure carbon dioxide content from fuel burning.

The fuel sensor 152 can be positioned in communication with the energy source 116 or fuel tank to determine an amount of fuel in the fuel tank as well as fuel pressure The computing device 124 may be used to perform functions of methods described herein, and may be coupled to the sensors 122 (or in communication with each of the sensors 122) to receive outputs of the sensors 122. The computing device 124 has a processor(s) 156, and also a communication interface 158, data storage 160, an output interface 162, and a display 164 each connected to a communication bus 166. The computing device 124 may also include hardware to enable communication within the computing device 124 and between the computing device 124 and other devices (not shown). The hardware may include transmitters, receivers, and antennas, for example.

The communication interface 158 may be a wireless interface and/or one or more wireline interfaces that allow for both short-range communication and long-range communication to one or more networks or to one or more remote devices. Such wireless interfaces may provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 158 may be configured to receive input data from one or more devices, and may also be configured to send output data to other devices. For example, the communication interface 158 may communicate wirelessly with the airport control tower 104 and/or the UAV control center 106, and may be coupled for communication to the control device 110.

The data storage 160 may include or take the form of one or more computer-readable storage media that can be read or accessed by the processor(s) 156. The computer-readable storage media can include volatile and/or non-volatile storage components, such as optical, magnetic, organic or other memory or disc storage, which can be integrated in whole or in part with the processor(s) 156. The data storage 160 is considered non-transitory computer readable media. In some examples, the data storage 160 can be implemented using a single physical device (e.g., one optical, magnetic, organic or other memory or disc storage unit), while in other examples, the data storage 160 can be implemented using two or more physical devices.

The data storage 160 thus is a non-transitory computer readable storage medium, and executable instructions 168 are stored thereon. The instructions 168 include computer executable code. The data storage 160 also stores reference flight data 170 that includes a data stream collected for the sensors 122 positioned at a substantially same location on the aircraft 102, during substantially same flight conditions, and during a successful takeoff of the aircraft 102 at a prior instance. Thus, the reference flight data 170 may be considered historical flight data that indicates outputs of the sensors 122 collected and received during a successful flight. As such, the reference flight data 170 is indicative outputs of the sensors 122 during normal operating conditions.

When the instructions 168 are executed by the processor(s) 156, the processor(s) 156 are caused to perform functions including receiving outputs from the plurality of sensors 122, comparing the outputs received from the plurality of sensors 122 for the current flight to the reference flight data 170, making a determination of whether to initiate a TOR procedure before the aircraft 102 reaches a takeoff speed on a runway, and based on determining to initiate the TOR procedure, sending a signal to the control device 110 on the aircraft 102 to initiate the TOR procedure.

The processor(s) 156 may be a general-purpose processor or a special purpose processor (e.g., digital signal processors, application specific integrated circuits, etc.). The processor(s) 156 may receive inputs from the communication interface 158 as well as from the sensors 122, and process the inputs to generate outputs that are stored in the data storage 160 and output to the display 164. The processor(s) 156 can be configured to execute the executable instructions 168 (e.g., computer-readable program instructions) that are stored in the data storage 160 and are executable to provide the functionality of the computing device 124 described herein.

The output interface 162 outputs information to the display 164 or to other components as well, such as to the control device 110. Thus, the output interface 162 may be similar to the communication interface 158 and can be a wireless interface (e.g., transmitter) or a wired interface as well.

Figure 2:
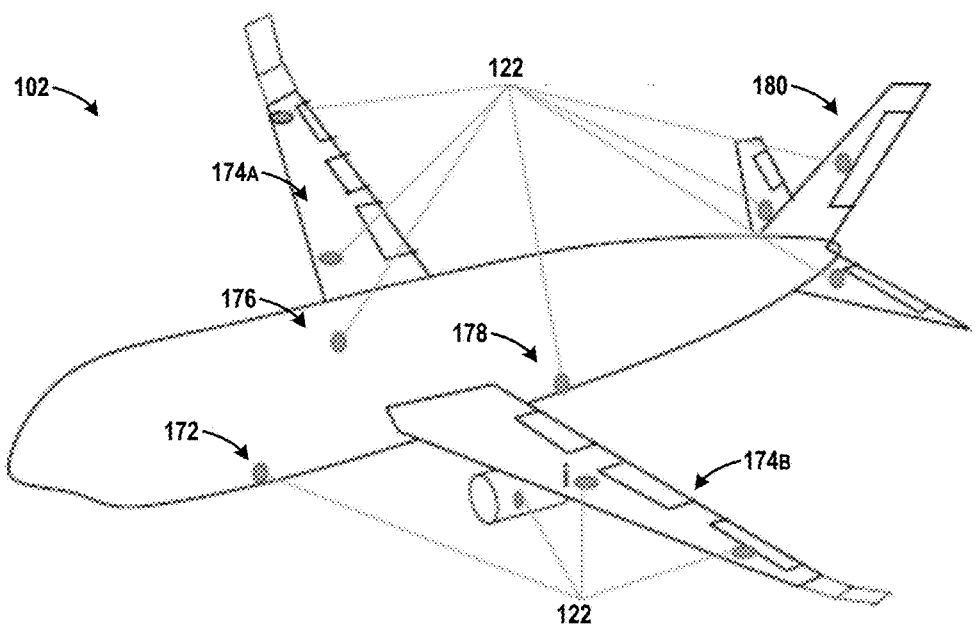
FIG. 2 illustrates an example of the aircraft with the sensors positioned at different areas on the aircraft, according to an example implementation.

FIG. 2 illustrates an example of the aircraft 102 with the sensors 122 positioned at different areas on the aircraft 102, according to an example implementation. As shown in FIG. 2, the sensors 122 may be positioned in a cargo area 172, on a wing 174a-b, in a cabin 176, on a fuselage 178, and on a tail 180 of the aircraft, for example.

The sensors 122 comprise a network of sensors, each of which may be grouped into multiple arrays of sensors, for example. Each array of sensors may include one or more sensors that capture one type of physics phenomenon, such as described above. A total of N different sensors or arrays of sensors may be included, where N is a number dependent upon a size of the aircraft 102, for example. The system 108 monitors and collects sensor data from the sensors 122 at a number of instances, such as at a time when the aircraft 102 initiates the APU 118 prior to leaving a gate, at a time when the aircraft 102 runs a main engine 114 at a gate, when the aircraft 102 taxis to a runway, when the aircraft 102 arrives at a beginning of the runway, and when the aircraft 102 increases a speed on the runway for takeoff. In some examples, the sensor data is collected at these discrete time periods. In other examples, the sensor data is continuously collected started from a time when the aircraft 102 initiates the APU 118 prior to leaving a gate and ending when the aircraft takes off.

Figure 3:
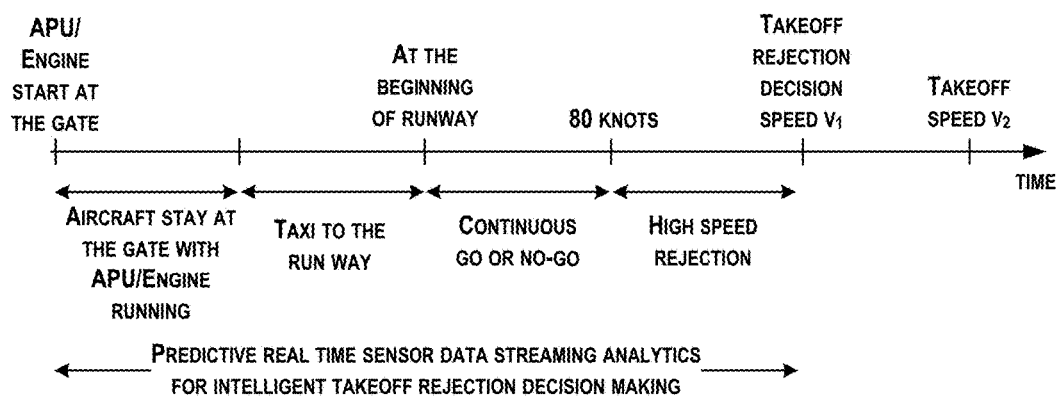
FIG. 3 is an example timeline of events monitored on the aircraft prior to takeoff, according to an example implementation.

FIG. 3 is an example timeline of events monitored on the aircraft 102 prior to takeoff, according to an example implementation. As mentioned above, outputs of the sensors 122 can be collected at various instances, such as when the APU 118 or the engine 114 is started while the aircraft 102 is at the gate, at times when the aircraft 102 taxis to the runway, at a time when the aircraft 102 arrives at a beginning of the runway, at a time at which a velocity of the aircraft 102 is 80 knots during takeoff, and at a time when a velocity of the aircraft reaches a speed of $V_1$.

As the aircraft 102 goes down the runway, situations may occur in which it is decided to perform a TOR decision. The total energy that may be dissipated during the rejected takeoff may be proportional to a square of a velocity of the aircraft 102. At low speeds, up to approximately 80 knots, the energy level is generally low. Therefore, the aircraft 102 may be stopped for a variety of events that may be considered undesirable for continued takeoff roll or flight. As the airspeed of the aircraft 102 approaches $V_1$, effort required to stop the aircraft 102 can approach an airplane maximum stopping capability. Therefore, a decision to perform a TOR beyond 80 knots and below $V_1$ should be made only for specific hazardous conditions that threaten safety of flight. Performing a TOR at or past $V_1$ may result in the aircraft 102 stopping beyond an end of the runway and any decision delay at high speeds increases these risks.

Thus, the sensors 122 located throughout the aircraft 102 monitor different conditions on the aircraft 102 as well as monitor different operating conditions of one or more aircraft systems. For example, one or more of the sensors 122 may be used to indicate a fire on the aircraft 102, in the aircraft engine 114, or the like, engine failure, abnormal acceleration of the aircraft 102, tire failure, aircraft structural damage, predictive windshear warning, flight path obstruction, and the like.

At each of the time periods when the outputs from the plurality of sensors 122 are received at the computing device 124, the computing device compares the outputs received to the reference flight data 170, and based on comparing the outputs received to the reference flight data 170, the computing device 124 makes the determination of whether to initiate the TOR procedure. As shown in FIG. 3, the computing device 124 may make such determinations on a continuous basis to output a continuous go or no-go decision to the control device 110. As a result, the computing device 124 performs predictive real time sensor data streaming analytics for intelligent TOR decision making.

In addition, the computing device 124 also receives non-sensor data from the airport control tower 104 or from the UAV control center 106 during all time periods prior to takeoff, and based on (i) comparing the outputs received from the plurality of sensors 122 for the current flight to the reference flight data 170 and (ii) the non-sensor data, the computing device 124 makes the determination of whether to initiate the TOR procedure. For example, operators at the airport may at any time prior to takeoff issue a TOR decision independent of the operating conditions of the aircraft 102, and the computing device 124 can then initiate the TOR procedures according. Thus, the airport control tower 104 and the UAV control center 106 can issue a no-go decision directly, and the predictive data analytics results from the sensors 122 can also result in a no-go decision. The TOR procedures generally include control the aircraft 102 to come to a stop, for example.

Figure 4:
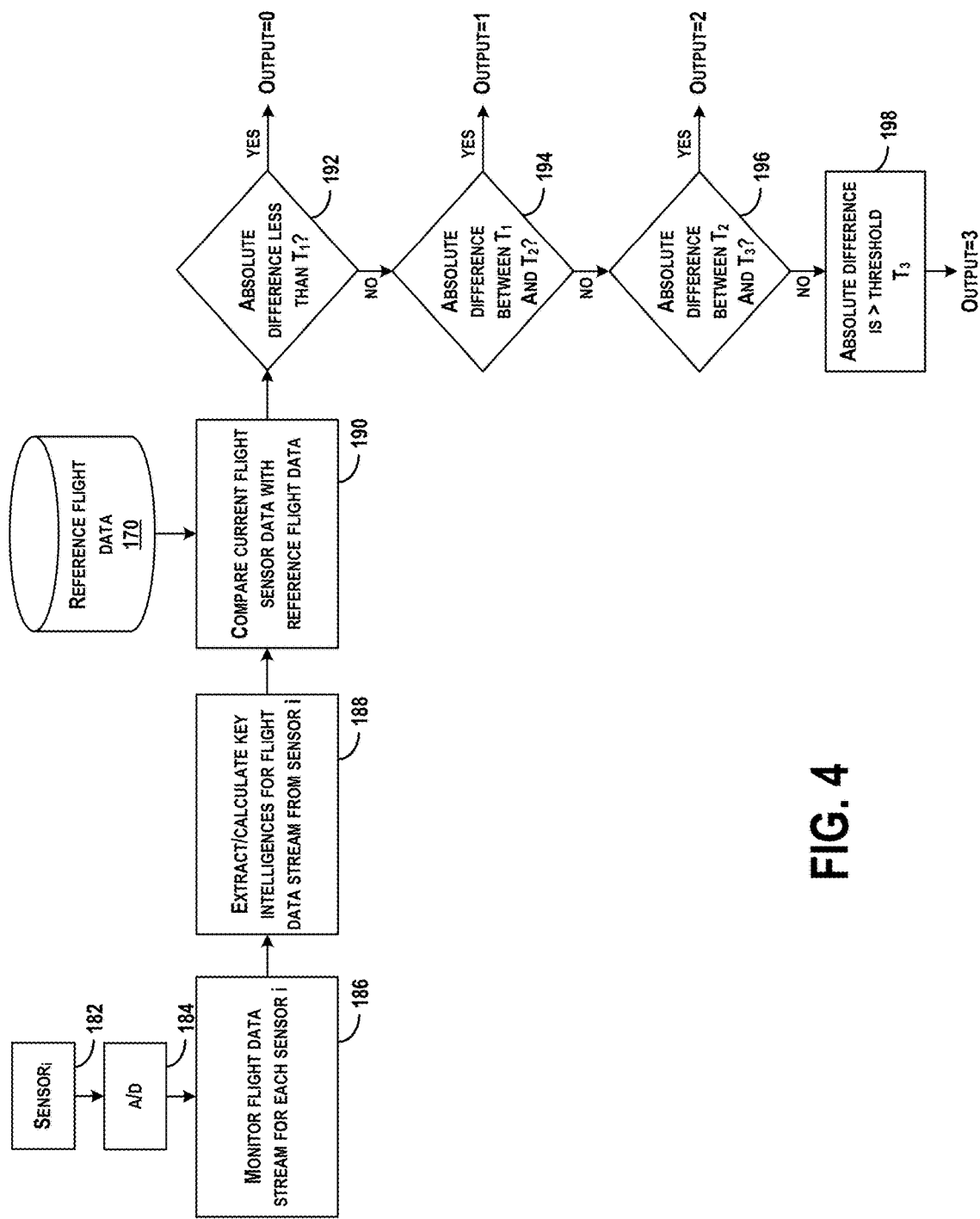
FIG. 4 is a flow diagram illustrating example functions performed by the computing device for making the TOR decision based on the analytics results for a single sensor, according to an example implementation.

FIG. 4 is a flow diagram illustrating example functions performed by the computing device 124 for making the TOR decision, according to an example implementation. The flow diagram in FIG. 4 illustrates an example three level step-by-step method for intelligent predictive decision making for a TOR that is performed in real-time as data is output and received from the sensors 122.

Initially, at block 182, data is output from $sensor_i$, where the plurality of sensors 122 includes $sensors_{i-n}$. The data may be analog in format, and thus, the data may be passed through an analog to digital (A/D) converter 184 (which may be a component of the computing device 124 or separate from the computing device 124).

The computing device 124 monitors flight data streams received for each $sensor_i$, at block 186, and extracts or calculates key intelligences for the flight data stream received from each $sensor_i$, at block 188. This can include, for example, one or more or a combination of information such as, an amplitude of a sensor signal at a specific time, a peak amplitude of outputs over a time period for the sensor data, a value between adjacent peak and valley values of sensor data over the time period, a standard deviation of sensor data over the time period, a root mean square of sensor data, a power spectrum density along a time period of the sensor data, or other information that represents certain characteristics of the data stream received from each $sensor_i$. Thus, for outputs from each $sensor_i$ of the plurality of sensors 122 received over the time period, a feature representative of characteristics of the outputs over the time period is extracted.

The extracted feature is a representation of physical phenomena of the sensor data. As the sensor data is continuously collected over time, a large amount of sensor data is received in a time series, and the feature extraction enables the computing device 124 to focus on information of the sensor data at a specific point in time. As an example, if an amplitude of vibration data output from the vibration sensor 126 is high amplitude at a time period, and a standard deviation looking at the entire time stream (e.g., 1-5 minutes) is minimum with a median of about zero, this indicates a high vibration is occurring that can be indicative of a potential issue with the aircraft 102. Thus, any combination of extracted features of sensor data can be used as well.

Following, at block 190, the computing device 124 compares the extracted feature representative of the characteristics of the outputs over the time period of each $sensor_i$ to the reference flight data 170. The reference flight data 170 refers to a historic data stream for the same sensor positioned at the same location on the aircraft recorded when the aircraft reported a successful takeoff and with the same/similar flight conditions (i.e., the same airplane, same/similar payloads, same airport with similar runway conditions, similar weather conditions, etc.).

For example, the temperature sensor 144 may collect data of a temperature of the engine 114 and the vibration sensor 126 may collect data of a vibration of the engine, and data of the temperature sensor 144 and the vibration sensor 126 output during a successful takeoff of the aircraft 102 is stored in the reference flight data 170. Then, for subsequent flights, data output from the temperature sensor 144 and the vibration sensor 126 can be compared one-to-one with data stored in the reference flight data 170. The data used for comparison can include the extracted features, and the stored data in the reference flight data 170 can also include previously extracted features, such that the comparison is performed to compare the same type of data.

Then, the computing device 124 performs the comparison with reference to three separate thresholds $T_1$, $T_2$, and $T_3$. The thresholds $T_1$, $T_2$, and $T_3$ represent thresholds for a difference between the data compared from the currently received sensor data and the data of the reference flight data 170. The thresholds $T_1$, $T_2$, and $T_3$ refer to a predefined scale of seriousness of abnormality or deviation from the reference flight data 170. For example, if a difference of the key intelligence extracted from current sensor data as compared to the reference flight data 170 has an absolute difference less than threshold $T_1$, it is a normal flight, and as shown at block 192, the computing device 124 outputs a value of zero (0). If a difference of the key intelligence extracted from current sensor data as compared to the reference flight data 170 is greater than or equal to $T_1$ but less than threshold $T_2$, then it has a minor abnormality, and at block 194, the computing device outputs a value of one (1). If a difference of the key intelligence extracted from current sensor data as compared to the reference flight data 170 is greater than or equal to threshold $T_2$ but less than threshold $T_3$, then it has a medium abnormality, and at block 196, the computing device 124 outputs a value of two (2). If a difference of the key intelligence extracted from current sensor data as compared to the reference flight data 170 is greater than or equal to threshold $T_3$, then it has a serious abnormality, and at block 198, the computing device outputs a value of three (3).

Thus, as the difference between the key intelligence extracted from current sensor data as compared to the reference flight data 170 increases, a larger value is generated. Generally, the larger the value generated, the more serious of an issue with the aircraft 102 is noted. At this stage, the computing device 124 can issue a TOR decision based on the values output for a level-one decision making process. As an example, if the value is one (1) or higher, a TOR decision may be issued. In other examples, if the value is two (2) or higher, the TOR decision may be issued.

Figure 5:
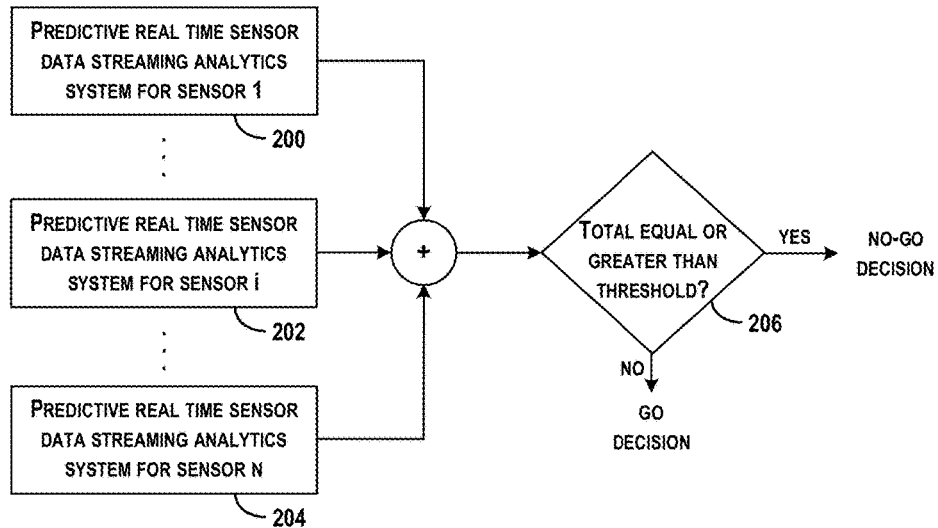
FIG. 5 is a flow diagram illustrating example functions performed by the computing device for making the TOR decision based on the combined analytics results for a plurality of sensors, according to an example implementation.

FIG. 5 is another flow diagram illustrating example functions performed by the computing device 124 for making the TOR decision, according to an example implementation. In FIG. 5 predictive real time sensor data streaming analytics for all sensors, such as $sensor_1$, $sensor_i$, and up to $sensor_n$ are collected at blocks 200, 202, and 204. These include the outputs generated by the functions performed and described in FIG. 4, for example, per senor. Thus, each sensor is assigned a value, and as shown in FIG. 5, those values are summed, and when the total is equal or greater than a threshold, as shown at block 206, a no-go (TOR) decision is issued. When the total is less than the threshold here at block 206, a go decision (ready for takeoff) is issued. The threshold at block 206 can be set to any value, such as a value of one (1), two (2), or three (3). The process shown in FIG. 5 fuses all sensor data to make the intelligent predictive decision on go or no-go, so as to take into account data from all different types of sensors positioned at various locations on the aircraft 102.

Using the process in FIG. 5, when a serious issue exists, resulting in a large single value, the TOR decision can be issued. In addition, when a number of subtle or minor issues exists, each resulting in small generated values, then those values are summed and when enough minor issues are determined, the TOR decision can be issued. Thus, the computing device 124 can determine, for each sensor, a comparison of the outputs received for the current flight to the reference flight data 170 (or a comparison of key intelligences extracted from current sensor data as compared to the reference flight data 170), and based on a combination of comparisons of outputs for each sensor of the plurality of sensors to the reference flight data being outside of the threshold range of the reference flight data, the computing device determining to initiate the TOR procedure.

Figure 6:
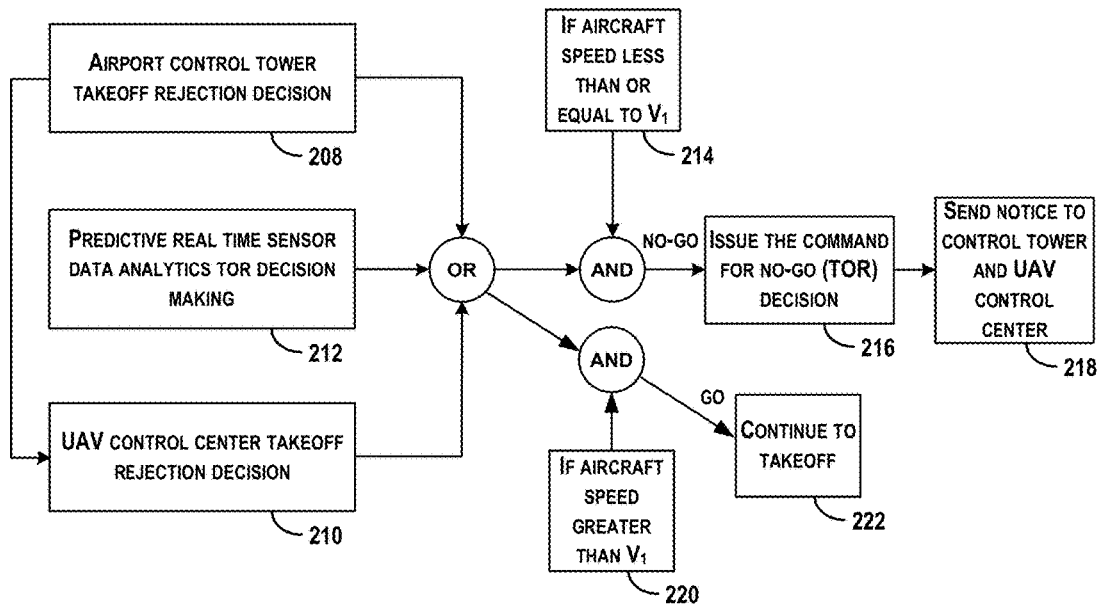
FIG. 6 is a flow diagram illustrating example functions performed by the computing device for issuing the TOR command based on the takeoff speed and the TOR decision from airport control tower, or UAV control center or the sensor systems, according to an example implementation.

FIG. 6 is another flow diagram illustrating example functions performed by the computing device 124 to issue the TOR command, according to an example implementation. The processes shown in FIG. 6 further take into account airport control tower takeoff rejection decision or UAV control center takeoff rejection decision if the aircraft 102 is a UAV, as shown at blocks 208 and 210, in addition to the predictive real time sensor data analytics for TOR decision making, as shown at block 212 and as output from the processes shown in FIG. 5.

Thus, if the TOR decision is received from at least one of the sources: the airport control tower 104 or the UAV control center 106 or the predictive real time sensor data analytics system and if the aircraft 102 speed is less than or equal to $V_1$, as shown at block 214, then the computing device 124 issues a command for no-go (e.g., the TOR decision), as shown at block 216. Further, the computing device 124 sends a notice to the control tower and UAV control center of the TOR decision, as shown at block 218. However, if the aircraft 102 speed is greater than $V_1$, as shown at block 220, although at least one of TOR decisions are received, the aircraft 102 still continues to takeoff, as shown at block 222.

The processes shown in FIG. 6 merge overall data to fuse data from sensors, data from the airport control tower 104 and the UAV control center 106, and issues (or not issues) the command for No-Go (TOR decision) based on a speed of the aircraft being less than $V_1$. Here, the airport control tower 104 and the UAV control center 106 can issue a no-go decision directly and the predictive analytics results from the sensors can also issue a no-go decision.

Figure 7:
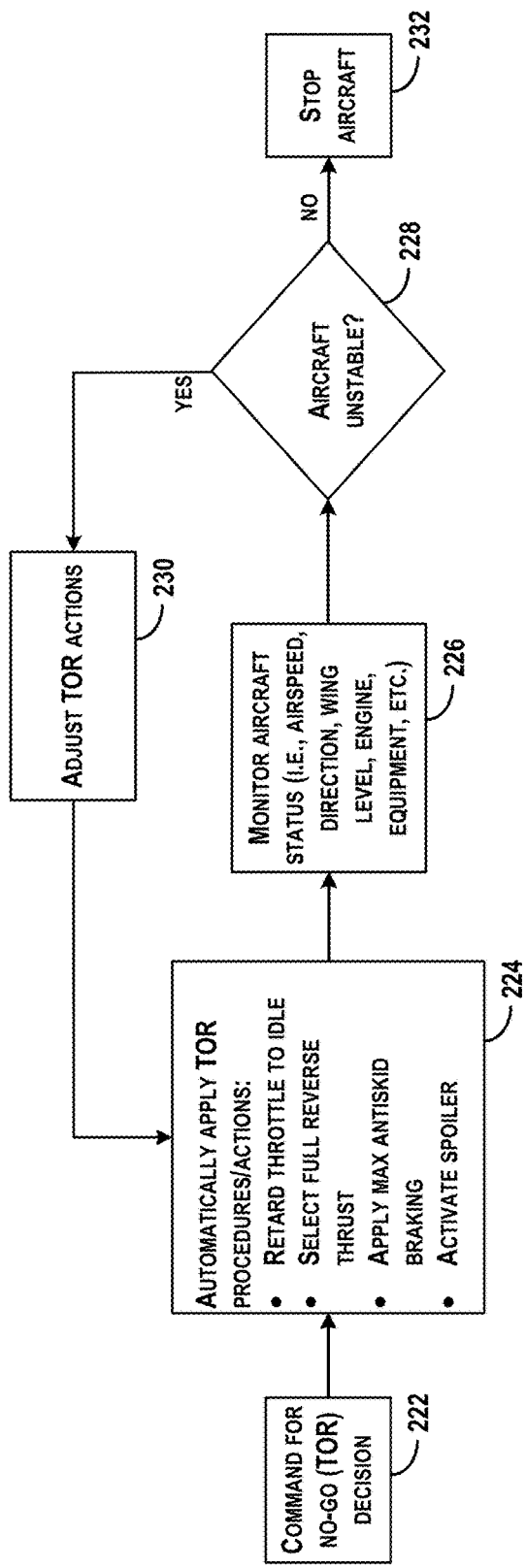
FIG. 7 is a flow diagram illustrating example functions performed by the computing device to automatically start TOR procedures and actions, and to control the aircraft for a safe stop, according to an example implementation.

FIG. 7 is a flow diagram illustrating example functions performed by the computing device 124 to automatically start TOR procedures and actions, and to control the aircraft 102 for a safe stop, according to an example implementation. As shown at block 222, the command for no-go (e.g., TOR) is issued to the control device 110, and the control device 110 operates the vehicle control system 112 to retard throttle to idle, select full reverse thrust, apply maximum antiskid braking, and activate spoiler, for example, as well as inform/instruct the pilot to bring the aircraft 102 to a stop, as shown at block 224. The control device 110 and/or the computing device 124 can then monitor aircraft status (i.e., airspeed, direction, wing level, engine, equipment, etc.), as shown at block 226 to determine if the aircraft 102 becomes unstable, as shown at block 228. If so, as shown at block 230, the TOR actions can be adjusted. If not, the aircraft 102 comes to a stop, as shown at block 232.

Figure 8:
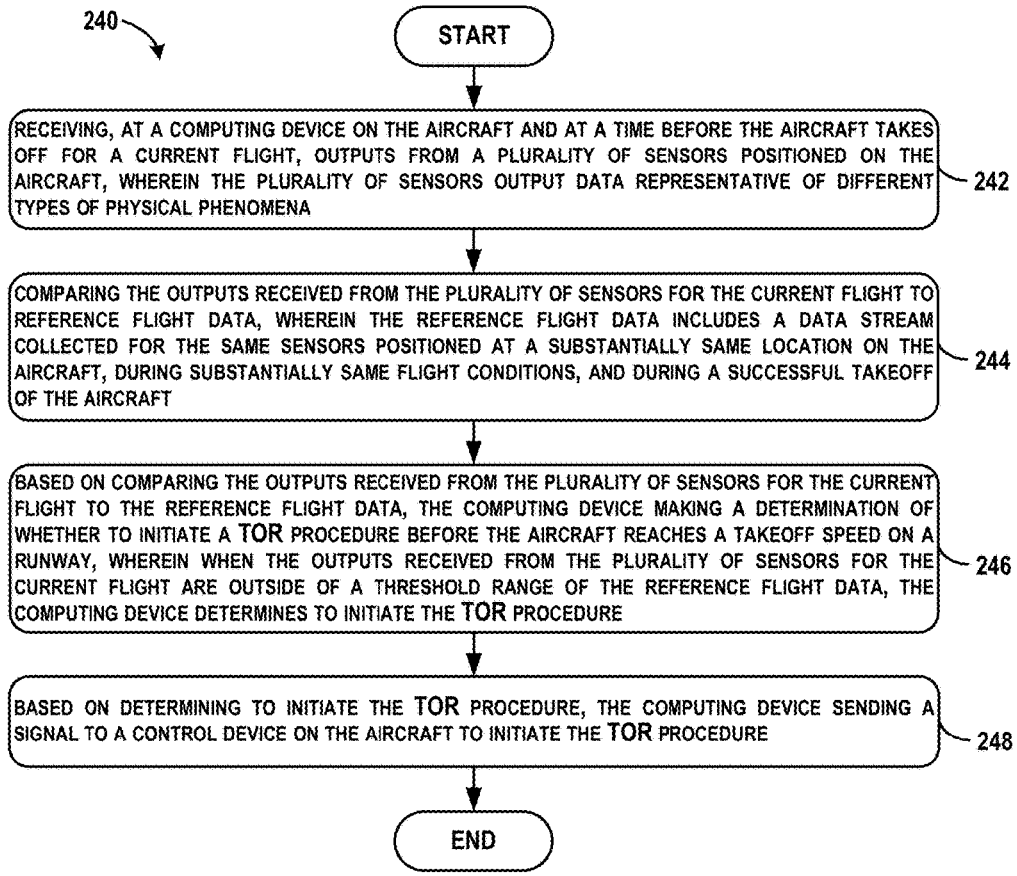
FIG. 8 shows a flowchart of an example method 240 for predictive take-off rejection (TOR) of the aircraft, according to an example implementation.

FIG. 8 shows a flowchart of an example method 240 for predictive take-off rejection (TOR) of the aircraft 102, according to an example implementation. Method 240 shown in FIG. 8 presents an example of a method that could be used with the system 108 or the computing device 124, shown in FIG. 1, for example. Further, devices or systems may be used or configured to perform logical functions presented in FIG. 8. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 240 may include one or more operations, functions, or actions as illustrated by one or more of blocks 242-248. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 8, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 242, the method 240 includes receiving, at the computing device 124 on the aircraft 102 and at a time before the aircraft 102 takes off for a current flight, outputs from the plurality of sensors 122 positioned on the aircraft 102, and the plurality of sensors 122 output data representative of different types of physical phenomena. Within examples, this includes receiving the outputs from sensors including one or more of the vision sensor 134, the audio sensor 136, the ultrasound sensor 138, the strain gauge sensor 142, the temperature sensor 144, the fire/smoke sensor 130, the fuel sensor 152, the hydraulic pressure sensor 128, the landing gear tire pressure sensor 132, the electricity load sensor 140, and the vibration sensor 126. The plurality of sensors 122 are positioned on the aircraft 102 at different areas as well.

In addition, this can include receiving the outputs from the plurality of sensors 122 at a time when the aircraft 102 initiates the APU 118 prior to leaving a gate and/or at a time when the aircraft 102 runs the main engine 114 at a gate. By receiving the outputs early and before the aircraft 102 enters the runway, a TOR decision can be made as soon as possible to avoid executing a TOR decision while the aircraft 102 is in motion during takeoff.

At block 244, the method 240 includes comparing the outputs received from the plurality of sensors 122 for the current flight to reference flight data, and the reference flight data includes a data stream collected for the same sensors positioned at a substantially same location on the aircraft 102, during substantially same flight conditions, and during a successful takeoff of the aircraft 102. Thus, the reference flight data 170 that is used for comparison is data collected based on a replica of the aircraft 102 and as close as possible to a replica of the environment and takeoff conditions, for example.

At block 246, the method 240 includes based on comparing the outputs received from the plurality of sensors 122 for the current flight to the reference flight data 170, the computing device 124 making a determination of whether to initiate a TOR procedure before the aircraft 102 reaches a takeoff speed on a runway, and when the outputs received from the plurality of sensors 122 for the current flight are outside of a threshold range of the reference flight data 170, the computing device 124 determines to initiate the TOR procedure.

Within examples, by receiving outputs of many different sensors positioned at different areas on the aircraft 102 prior to takeoff, the computing device 124 can predict whether a mechanical issue may arise in the future (e.g., during flight) by comparison to the reference flight data 170. If there is a deviation from the reference flight data 170, the computing device 124 can predict that a problem is more likely to occur, and thus, the computing device 124 issued the TOR decision. This enables a TOR decision to be made in instances in which it is not immediately known that a problem exists, but rather, it is determined that a problem has a possibility of existing sometime in the future.

In addition, by the computing device 124 considering outputs of all the sensors 122, a combination of small minor issues can result in the TOR decision being made. As an example, an output of the temperature sensor 144 can indicate that the main engine 114 is running hotter than expected but not outside of temperature limits (as compared to the reference flight data 170), and thus, this alone would not cause a TOR decision. However, if during the same time and output of the vibration sensor 126 indicates further issues with the engine 114 vibrating outside of normal ranges (as compared to the reference flight data 170), then the computing device 124 can now make a determination to issue the TOR decision based on a prediction that when these two sensors provide outputs that deviate from the reference flight data 170, a possible mechanical problem may result with the engine 114 even though the engine 114 is running within acceptable manufacturing guidelines at the current time.

At block 248, the method 240 includes based on determining to initiate the TOR procedure, the computing device 124 sending a signal to the control device 110 on the aircraft 102 to initiate the TOR procedure. In instances in which the computing device 124 and the control device 110 are coupled, this can include sending a wired communication. In other instances, the computing device 124 can be in wireless communication with the control device 110 as well. In still further examples, the computing device 124 and/or the control device 110 can then cause the vehicle control system 112 to bring the aircraft 102 to a stop (if the aircraft 102 had left the gate and possibly begun takeoff procedures), or simply cause the vehicle control system 112 to shut down the engine 114 if the aircraft 102 is still at the gate.

Figure 9:
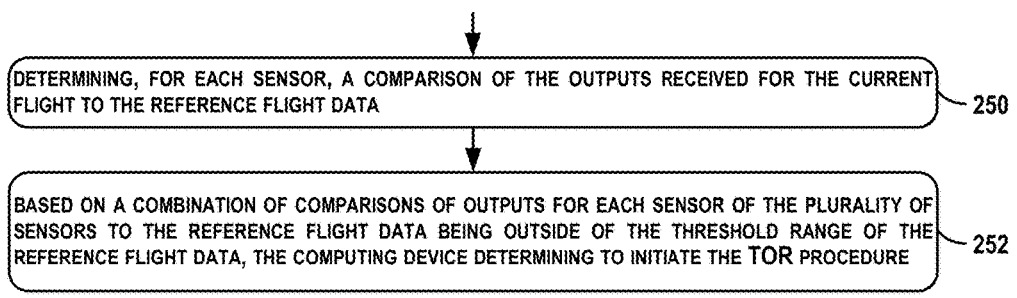
FIG. 9 shows a flowchart of an example method for use with the method 240, according to an example implementation.

FIG. 9 shows a flowchart of an example method for use with the method 240, according to an example implementation. At block 250, functions include determining, for each sensor 122, a comparison of the outputs received for the current flight to the reference flight data 170, and at block 252, based on a combination of comparisons of outputs for each sensor 122 of the plurality of sensors 122 to the reference flight data 170 being outside of the threshold range of the reference flight data, the computing device 124 determining to initiate the TOR procedure. In this example, the computing device 124 can make the TOR decision based on many minor issues being detected, each of which on their own would not cause the TOR decision to be made, but together can result in making the TOR decision due to the negative predictive result determined as a possibility of occurring when compared to the reference flight data 170.

Figure 10:
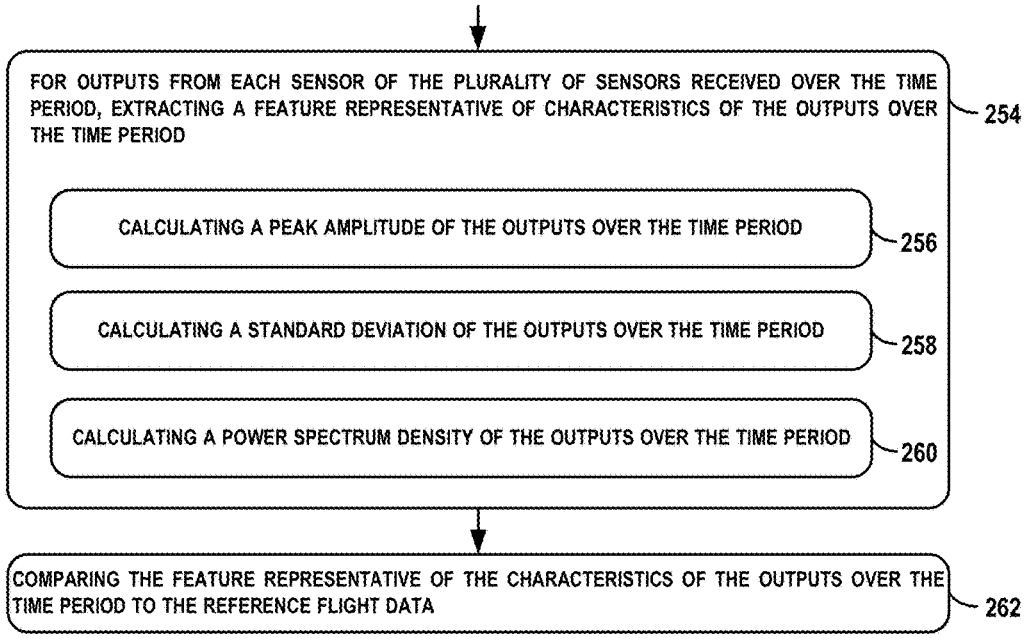
FIG. 10 shows a flowchart of an example method for use with the method, according to an example implementation.

FIG. 10 shows a flowchart of an example method for use with the method 240, according to an example implementation. At block 254, functions include for outputs from each sensor of the plurality of sensors 122 received over the time period, extracting a feature representative of characteristics of the outputs over the time period. Within examples, this can include calculating one or more of: a peak amplitude of the outputs over the time period, a standard deviation of the outputs over the time period, and a power spectrum density of the outputs over the time period, as shown at blocks 256, 258, and 260. The functions also include, as shown at block 262, comparing the feature representative of the characteristics of the outputs over the time period to the reference flight data 170.

Figure 11:
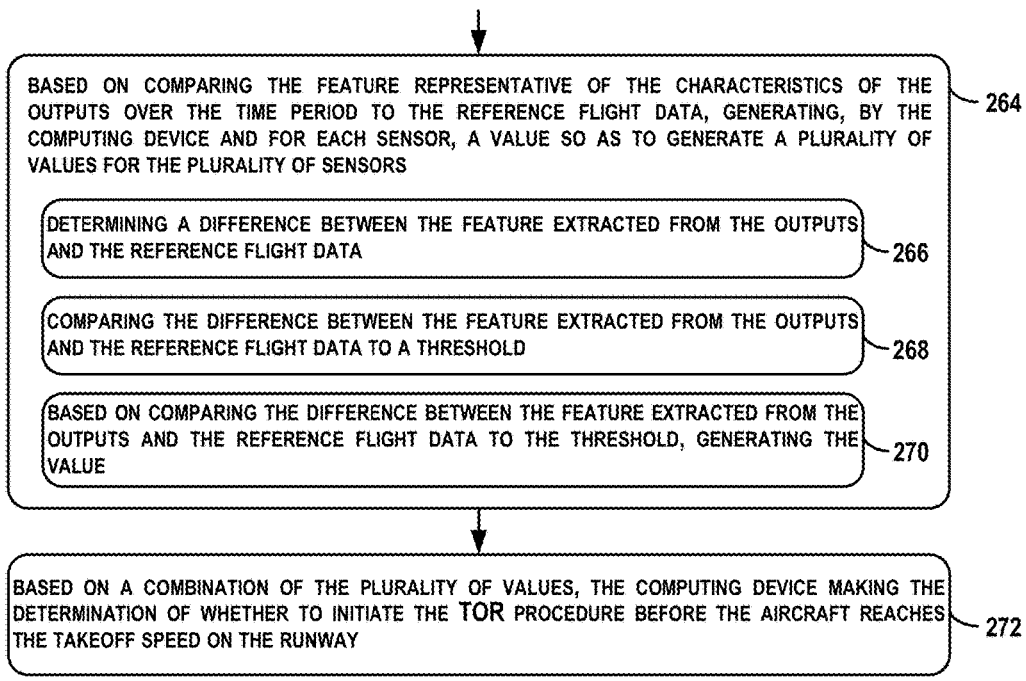
FIG. 11 shows a flowchart of an example method for use with the method, according to an example implementation.

FIG. 11 shows a flowchart of an example method for use with the method 240, according to an example implementation. At block 264, functions include based on comparing the feature representative of the characteristics of the outputs over the time period to the reference flight data 170, generating, by the computing device 124 and for each sensor, a value so as to generate a plurality of values for the plurality of sensors 122. This can include, for example, determining a difference between the feature extracted from the outputs and the reference flight data 170, comparing the difference between the feature extracted from the outputs and the reference flight data 170 to a threshold, and based on comparing the difference between the feature extracted from the outputs and the reference flight data 170 to the threshold, generating the value, as shown at blocks 266, 268, and 270. As the difference increases, a larger value is generated.

In FIG. 11, the functions also include, as shown at block 272, based on a combination of the plurality of values, the computing device 124 making the determination of whether to initiate the TOR procedure before the aircraft 102 reaches the takeoff speed on the runway.

Figure 12:
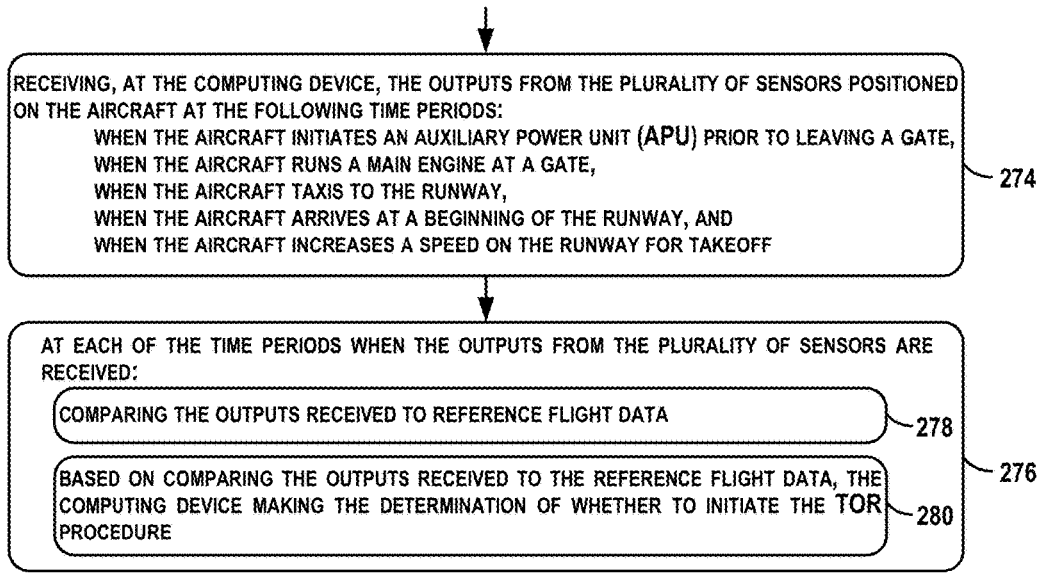
FIG. 12 shows a flowchart of an example method for use with the method, according to an example implementation.

FIG. 12 shows a flowchart of an example method for use with the method 240, according to an example implementation. At block 274, functions include receiving, at the computing device 124, the outputs from the plurality of sensors 122 positioned on the aircraft 102 at the following time periods: when the aircraft 102 initiates the APU 118 prior to leaving a gate, when the aircraft 102 runs the main engine 114 at a gate, when the aircraft 102 taxis to the runway, when the aircraft 102 arrives at a beginning of the runway, and when the aircraft 102 increases a speed on the runway for takeoff. In FIG. 12, the functions also include, as shown at block 276, at each of the time periods when the outputs from the plurality of sensors 122 are received: comparing the outputs received to reference flight data 170, as shown at block 278, and based on comparing the outputs received to the reference flight data 170, the computing device 124 making the determination of whether to initiate the TOR procedure, as shown at block 280.

Figure 13:
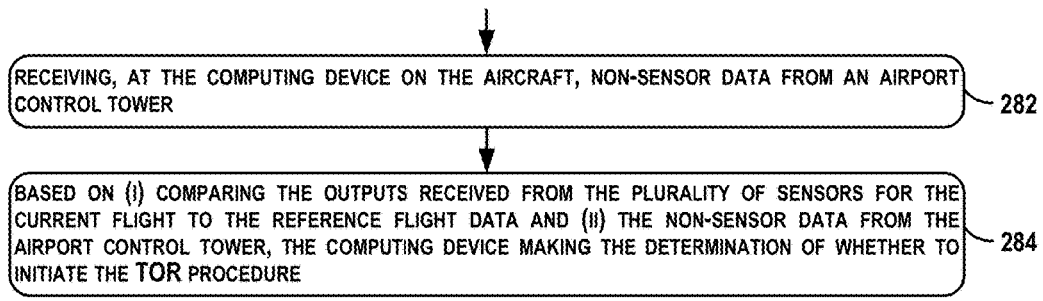
FIG. 13 shows a flowchart of an example method for use with the method, according to an example implementation.

FIG. 13 shows a flowchart of an example method for use with the method 240, according to an example implementation. At block 282, functions include receiving, at the computing device 124 on the aircraft 102, non-sensor data from the airport control tower 104, and based on (i) comparing the outputs received from the plurality of sensors 122 for the current flight to the reference flight data 170 and (ii) the non-sensor data from the airport control tower 104, the computing device 124 making the determination of whether to initiate the TOR procedure, as shown at block 284. In this example, either of the outputs from the sensors 122 or the commands received from the airport control tower 104 can cause the TOR decision to be made.

Figure 14:
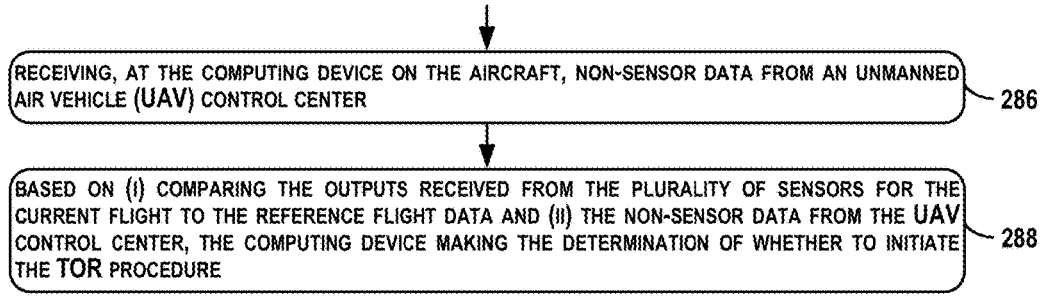
FIG. 14 shows a flowchart of an example method for use with the method, according to an example implementation.

FIG. 14 shows a flowchart of an example method for use with the method 240, according to an example implementation. At block 286, functions include receiving, at the computing device 124 on the aircraft 102, non-sensor data from an unmanned air vehicle (UAV) control center 106, and based on (i) comparing the outputs received from the plurality of sensors 122 for the current flight to the reference flight data 170 and (ii) the non-sensor data from the UAV control center 106, the computing device 124 making the determination of whether to initiate the TOR procedure, as shown at block 288.

Figure 15:
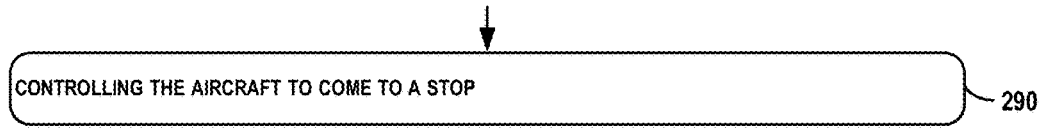
FIG. 15 shows a flowchart of an example method for use with the method, according to an example implementation.

FIG. 15 shows a flowchart of an example method for use with the method 240, according to an example implementation. At block 290, functions include controlling the aircraft 102 to come to a stop. Examples of controlling the aircraft 102 to stop are described above with reference to FIG. 7.

By the term "real time" used herein, it is meant that the computing device 124 performs the actions of determining whether to issue the TOR decision during receipt of data from the sensors 122, which can occur on a continuous basis. The real time processing may continually process outputs of the sensors 122 to determine whether any output as compared to the reference flight data 170 is indicative of a condition warranting issuance of the TOR decision, for example.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for predictive take-off rejection (TOR) of an aircraft, comprising:

receiving, at a computing device on the aircraft and at a time before the aircraft takes off for a current flight, outputs from a plurality of sensors positioned on the aircraft, wherein the plurality of sensors output data representative of different types of physical phenomena;

comparing the outputs received from the plurality of sensors for the current flight to reference flight data, wherein the reference flight data includes a data stream collected for the same sensors positioned at a substantially same location on the aircraft, during substantially same flight conditions, and during a successful takeoff of the aircraft;

based on comparing the outputs received from the plurality of sensors for the current flight to the reference flight data, the computing device making a determination of whether to initiate a TOR procedure before the aircraft reaches a takeoff speed on a runway, wherein when the outputs received from the plurality of sensors for the current flight are outside of a threshold range of the reference flight data, the computing device determines to initiate the TOR procedure; and based on determining to initiate the TOR procedure, the computing device sending a signal to a control device on the aircraft to initiate the TOR procedure.

2. The method of claim 1, wherein receiving the outputs from the plurality of sensors positioned on the aircraft comprises receiving the outputs from sensors including one or more of a vision sensor, an audio sensor, an ultrasound sensor, a strain gauge sensor, a temperature sensor, a fire/smoke sensor, a fuel sensor, a hydraulic pressure sensor, a landing gear tire pressure sensor, an electricity load sensor, and a vibration sensor.

3. The method of claim 1, wherein receiving the outputs from the plurality of sensors positioned on the aircraft comprises receiving the outputs from sensors positioned at different areas on the aircraft.

4. The method of claim 1, wherein receiving the outputs from the plurality of sensors positioned on the aircraft comprises receiving the outputs at a time when the aircraft initiates an auxiliary power unit (APU) prior to leaving a gate.

5. The method of claim 1, wherein receiving the outputs from the plurality of sensors positioned on the aircraft comprises receiving the outputs at a time when the aircraft runs a main engine at a gate.

6. The method of claim 1, further comprising:

determining, for each sensor, a comparison of the outputs received for the current flight to the reference flight data; and based on a combination of comparisons of outputs for each sensor of the plurality of sensors to the reference flight data being outside of the threshold range of the reference flight data, the computing device determining to initiate the TOR procedure.

7. The method of claim 1, wherein the outputs are received over a time period and the method further comprises:

for outputs from each sensor of the plurality of sensors received over the time period, extracting a feature representative of characteristics of the outputs over the time period; and wherein comparing the outputs received from the plurality of sensors for the current flight to reference flight data comprises comparing the feature representative of the characteristics of the outputs over the time period to the reference flight data.

8. The method of claim 7, wherein extracting the feature representative of characteristics of the outputs over the time period comprises:
calculating one or more of:
a peak amplitude of the outputs over the time period;
a standard deviation of the outputs over the time period; and
a power spectrum density of the outputs over the time period.

9. The method of claim 7, further comprising:
based on comparing the feature representative of the characteristics of the outputs over the time period to the reference flight data, generating, by the computing device and for each sensor, a value so as to generate a plurality of values for the plurality of sensors; and
based on a combination of the plurality of values, the computing device making the determination of whether to initiate the TOR procedure before the aircraft reaches the takeoff speed on the runway.

10. The method of claim 9, wherein generating the value comprises:
determining a difference between the feature extracted from the outputs and the reference flight data;
comparing the difference between the feature extracted from the outputs and the reference flight data to a threshold; and
based on comparing the difference between the feature extracted from the outputs and the reference flight data to the threshold, generating the value,
wherein as the difference increases, a larger value is generated.

11. The method of claim 1, further comprising:
receiving, at the computing device, the outputs from the plurality of sensors positioned on the aircraft at the following time periods:
when the aircraft initiates an auxiliary power unit (APU) prior to leaving a gate,
when the aircraft runs a main engine at a gate,
when the aircraft taxis to the runway,
when the aircraft arrives at a beginning of the runway, and
when the aircraft increases a speed on the runway for takeoff, and
at each of the time periods when the outputs from the plurality of sensors are received:
comparing the outputs received to reference flight data; and
based on comparing the outputs received to the reference flight data, the computing device making the determination of whether to initiate the TOR procedure.

12. The method of claim 1, further comprising:
receiving, at the computing device on the aircraft, non-sensor data from an airport control tower; and
based on (i) comparing the outputs received from the plurality of sensors for the current flight to the reference flight data and (ii) the non-sensor data from the airport control tower, the computing device making the determination of whether to initiate the TOR procedure.

13. The method of claim 1, wherein the aircraft is an unmanned air vehicle (UAV), and the method further comprises:
receiving, at the computing device on the aircraft, non-sensor data from an unmanned air vehicle (UAV) control center; and
based on (i) comparing the outputs received from the plurality of sensors for the current flight to the reference flight data and (ii) the non-sensor data from the UAV control center, the computing device making the determination of whether to initiate the TOR procedure.

14. The method of claim 1, further comprising:
controlling the aircraft to come to a stop.

15. A non-transitory computer readable storage medium having stored therein instructions, that when executed by a computing device having one or more processors, causes the computing device to perform functions comprising:
receiving, at a time before an aircraft takes off for a current flight, outputs from a plurality of sensors positioned on the aircraft, wherein the plurality of sensors output data representative of different types of physical phenomena;
comparing the outputs received from the plurality of sensors for the current flight to reference flight data, wherein the reference flight data includes a data stream collected for the same sensors positioned at a substantially same location on the aircraft, during substantially same flight conditions, and during a successful takeoff of the aircraft;
based on comparing the outputs received from the plurality of sensors for the current flight to the reference flight data, making a determination of whether to initiate a TOR procedure before the aircraft reaches a takeoff speed on a runway, wherein when the outputs received from the plurality of sensors for the current flight are outside of a threshold range of the reference flight data, the computing device determines to initiate the TOR procedure; and
based on determining to initiate the TOR procedure, sending a signal to a control device on the aircraft to initiate the TOR procedure.

16. The non-transitory computer readable storage medium of claim 15, wherein the functions further comprise:
receiving the outputs from the plurality of sensors positioned on the aircraft at the following time periods:
when the aircraft initiates an auxiliary power unit (APU) prior to leaving a gate,
when the aircraft runs a main engine at a gate,
when the aircraft taxis to the runway,
when the aircraft arrives at a beginning of the runway, and
when the aircraft increases a speed on the runway for takeoff, and
at each of the time periods when the outputs from the plurality of sensors are received:
comparing the outputs received to reference flight data; and
based on comparing the outputs received to the reference flight data, the computing device making the determination of whether to initiate the TOR procedure.

17. The non-transitory computer readable storage medium of claim 15, wherein the functions further comprise:

determining, for each sensor, a comparison of the outputs received for the current flight to the reference flight data; and based on a combination of comparisons of outputs for each sensor of the plurality of sensors to the reference flight data being outside of the threshold range of the reference flight data, the computing device determining to initiate the TOR procedure.

18. A system comprising:

a plurality of sensors positioned on an aircraft, wherein the plurality of sensors output data representative of different types of physical phenomena; and a computing device having one or more processors for executing instructions stored in a non-transitory computer readable storage medium to perform functions including:

receiving, at a time before the aircraft takes off for a current flight, outputs from the plurality of sensors positioned on the aircraft;

comparing the outputs received from the plurality of sensors for the current flight to reference flight data, wherein the reference flight data includes a data stream collected for the same sensors positioned at a substantially same location on the aircraft, during substantially same flight conditions, and during a successful takeoff of the aircraft;

based on comparing the outputs received from the plurality of sensors for the current flight to the reference flight data, making a determination of whether to initiate a TOR procedure before the aircraft reaches a takeoff speed on a runway, wherein when the outputs received from the plurality of sensors for the current flight are outside of a threshold range of the reference flight data, the computing device determines to initiate the TOR procedure; and based on determining to initiate the TOR procedure, sending a signal to a control device on the aircraft to initiate the TOR procedure.

19. The system of claim 18, wherein the outputs are received over a time period and the functions further comprise:

for outputs from each sensor of the plurality of sensors received over the time period, extracting a feature representative of characteristics of the outputs over the time period; and wherein comparing the outputs received from the plurality of sensors for the current flight to reference flight data comprises comparing the feature representative of the characteristics of the outputs over the time period to the reference flight data.

20. The system of claim 18, wherein the functions further comprise:

receiving non-sensor data from an airport control tower or from an unmanned air vehicle (UAV) control center; and based on (i) comparing the outputs received from the plurality of sensors for the current flight to the reference flight data and (ii) the non-sensor data, the computing device making the determination of whether to initiate the TOR procedure.

* * * * *